VERNON K. QUARVE
INVENTOR.

United States Patent Office 3,496,699
Patented Feb. 24, 1970

3,496,699
CURTAIN COATING APPARATUS WITH PREMELTER
Vernon K. Quarve, Minneapolis, Minn., assignor, by mesne assignments, to Eastman Kodak Company
Original application Oct. 21, 1965, Ser. No. 499,880, now Patent No. 3,441,013, dated Apr. 29, 1969. Divided and this application Apr. 8, 1968, Ser. No. 736,238.
Int. Cl. B05b 7/16, 13/02; B05c 5/00
U.S. Cl. 53—140                    1 Claim

ABSTRACT OF THE DISCLOSURE

Curtain coating apparatus including a supply of a molten synthetic resin, a nozzle for forming a curtain of molten resin, and a premelter for maintaining the supply level of molten resin. The premelter includes an endless moving surface which receives a synthetic resin in pellet form from a hopper and carries it past a source of thermal radiation causing it to melt. A heated blade removes the resin from the surface and directs it into the supply.

---

This application is a division of application Ser. No. 499,880, filed Oct. 21, 1965, now U.S. Patent No. 3,441,013.

This invention relates in general to the art pertaining to the coating of thermoplastic materials and more particularly to improved apparatus for melting solid pellets or granules of such material prior to coating a surface with the melt.

Coating surfaces with thermoplastic melts is well known in the prior art. According to curtain coating processes, a liquid molten coating material can be pumped from a suitable reservoir to an extrusion head or nozzle where a vertically descending curtain of molten coating material is formed. The coating material can be introduced into the reservoir as a liquid where it is retained in that state. An outside source of heat may be required to preserve the requistie viscosity of the coating material. Under normal operating procedures a coating material is advantageously premelted prior to being introduced into the reservoir; it is desirable, among other things, that this step be efficient, simple, susceptible of both intermittent and continuous operation and rapid starting.

In the past, premelting for melt coating purposes has generally been performed by a screw-type premelter which usually is fed by a hopper containing a supply of the solid, particulate coating material; such a hopper is equipped with an orifice suitable to allow the pellets to feed into one end of a tube containing a rotatable screw which is adapted as it turns to transport the coating material along the interior length of said tube. Surrounding the outer diameter of said tube, or contained within its walls, is a source of heat whose magnitude is sufficient to cause the pellets to melt in transit, emerging from the remaining end of said tube as a uniformly heated liquid amenable to be coated upon surfaces as desired.

While a screw-type premelter has been widely used, it is characterized by several drawbacks. For intermittent operation, the screw-type premelter is not altogether appropriate since an extended shutdown results in heat degradation of the coating material. If the heat is also turned off, then an undesirable skin or clumps of solid matter, which may have melting characteristics distinct from the pelletized material are often formed on and between internal surfaces. When heat degradation occurs, or when a skin or clumps of resin are allowed to form, the undesirable formations must be cleared before premelting can continue.

Major cleaning of a screw-type premelter is difficult, since access to the mechanism may be gained normally only after opening the sealed tube, disconnecting the power supply and removing the screw. The involvement associated with cleaning a screw-type premelter has, under normal operating conditions, resulted in leaving the apparatus sealed. This fact underlines a major drawback of the screw-type premelter which is its tendency to introduce foreign matter into the molten thermoplastic coating material. When the premelter is stopped, any residual resin contained therein is degraded by the existing heat, forming in many instances black specks or even a black mass of carbonized resin. Upon restarting, the previously degraded material is expelled from the premelter by the advancing column of freshly melted resin. This carbonized matter, particles of which emerge from the premelter over a somewhat extended period of time, must preferably be prevented from entering the main reservoir of coating material. If this should occur, since the system may be a recirculating one, the entire charge of resin may have to be removed and replaced with new material. The precautions necessary to avoid such contamination make intermittent operation a difficult process, and rapid starting is practically impossible. The column of resin which is transported along the melting tube's interior length may be of varying cross-section. With a screw-type premelter, the temperature which must be applied to the pelletized resin; depending upon the heat transfer characteristics of said resin, the cross-section of the resin column, the speed of transit and the length of the tube, can subject that portion of the resin which resides nearest said sources of heat to a temperature of such an elevation as will adversely affect the stability and quality of the coating resin.

Accordingly, it is an object of the present invention to provide an improved premelter which is readily susceptible of either intermittent or continuous operation.

An additional object of this invention is to provide a premelter which is rapid starting.

Another object of the instant invention is to provide a premelter which operates under heating conditions such that the melt produced is near the melting point of a coating resin and substantially uniform in temperature.

Yet another object of this invention is to provide a premelter which is relatively free of contamination and is susceptible of easy cleaning and repair.

Still another object of this invention is to provide a premelter in combination with a curtain coating machine exhibiting increased efficiency and simplicity of operation along with other advantages.

Other objects and advantages, though not specifically disclosed herein, will become apparent to one skilled in the art from the following detailed description.

According to a preferred embodiment, this invention provides a premelter for converting pellets of a thermoplastic coating composition into a melt useful in coating apparatus, which comprises:

(1) As pellet and melt carrying means, a heated movable endless surface, such as a rotatable drum or endless belt, adapted to be rotated about at least one substantially horizontal axis while pellets are being heated to form a molten layer on the movable surrface. The melting of the pellets advantageously begins as the surface moves upwardly from a position substantially in advance of an upper position perpendicular to said substantially horizontally positioned axis and continues until the surface moves downwardly to a lower position substantially perpendicular to said horizontally positioned axis but on the lower side thereof, at which point the pellets are now molten and flow from the surface into a reservoir. Removal of the melt from the surface may advantageously be aided by a scraper or doctor blade. Advantageously the blade can be heated so as to facilitate removal with minimum risk of accumulating degradation products, (2) As pellet and melt heating means, a source of thermal radiation directed toward said movable surface from a point beyond said means for depositing pellets upon the surface and to at least a point in close proximity to means for removing melt from the surface, (3) As means for removing melt, a scraper blade adapted to remove melt in contact with said movable surface at a point upon the lower portion of said surface and preferably at an angle of from about 100° to about 260° beyond on upper point perpendicular to the horizontal axis of the moving surface, (4) Means for maintaining said blade at a temperature the same or greater than that of the melt which it is adapted to remove, and (5) As means for depositing pellets, a hopper so positioned adjacent the moving surface that pellets not removed by the moving surface will fall by gravity back into the hopper. While operating the apparatus the pellet and melt heating means, element (2) above, normally can provide adequate residual heat in the moving surface as it reaches a position adjacent to the hopper whereby pellets from the hopper in contact with the hot surface stick thereto and are carried in an upwardly inlined direction, whereas pellets not in contact with the hot surface tend to fall back toward the hopper. Of course, supplemental heating means which can be designated element (6), can be provided so as to assure that the hot surface will be at least at the pellet minimum sticking temperature but below a temperature capable of melting those pellets not in contact with the hot surface.

The present invention will be further understood by reference to the following detailed description and related drawings in which.

Figure 1:
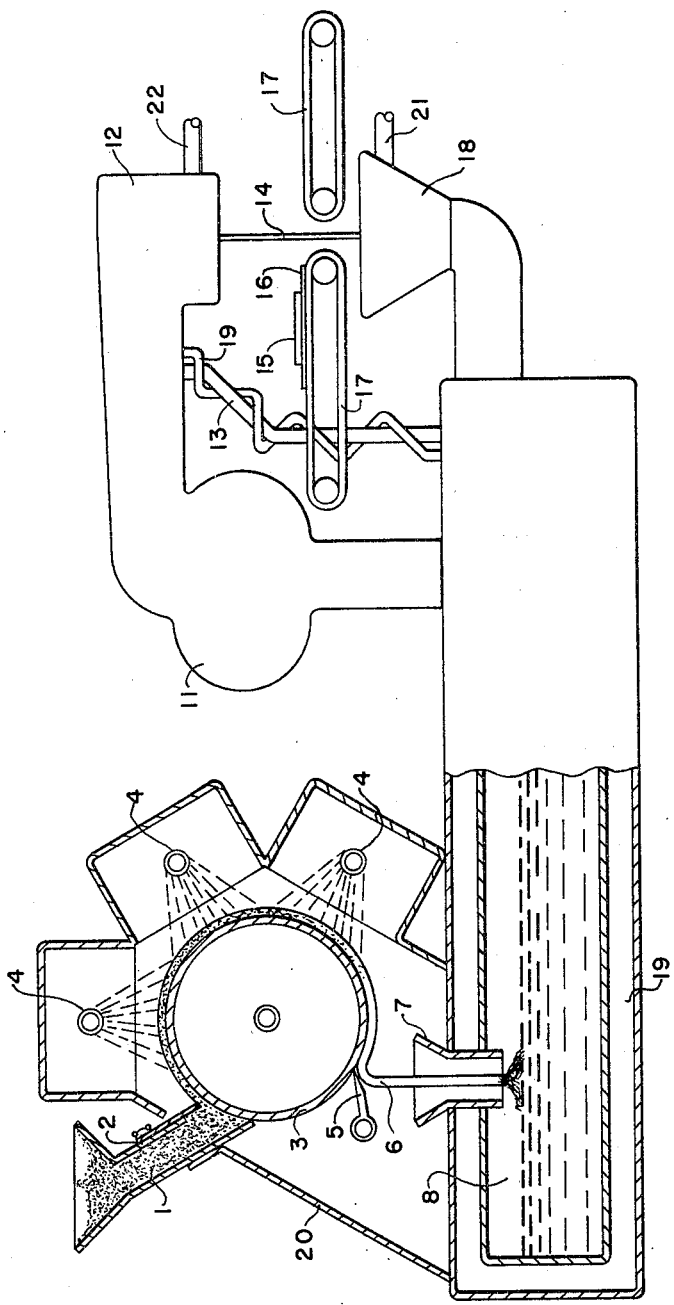
FIGURE 1 is an elevation and partial cross section of a preferred embodiment of the premelter in combination with a curtain coating machine which represents an especially advantageous coating apparatus.

While the novel premelter apparatus of the present invention is shown in FIGURE 1 of the drawings as being attached to curtain coating apparatus, it will be understood that it can be suitably attached by means not shown to other apparatus requiring a source of premelted plastic.

To practice the present invention according to an especially preferred embodiment, the premelter disclosed hereinbelow is advantageously used in conjunction with a curtain coating machine, as illustrated in the simple elevation of FIGURE 1, of the type disclosed in copending Chenoweth et al. application U.S. Ser. No. 259,707 filed Feb. 19, 1963, now U.S. Patent No. 3,299,195 wherein molten liquid coating material is pumped from a reservoir 8 through a suitable conduit by means of a pump 11 to an extrusion nozzle 12 adapted to form a substantially uniform, vertically descending curtain 14 of said liquid coating material. An object 15 to be coated is positioned on a suitable substrate 16 and this combination is transported through said thermoplastic curtain 14 upon a moving web 17. The coating material which is not utilized in coating is captured by a suitable trough 18 and returned to reservoir 8 to be recirculated and used again. The curtain coater can quite advantageously incorporate a bubble removing device as is disclosed in the above-mentioned copending U.S. application Ser. No. 259,707, in which case bubbles and other particles in the coating material are removed along with a portion of the coating material and returned to the reservoir 8 by means of by-pass pipe 13 while the remainder of the coating material enters extrusion nozzle 12. Those parts of the curtain coater which transmit molten coating material are provided with means to be heated such as by electric resistance heaters, hot oil, steam, or any other suitable means, as illustrated by the electrical element 19 surrounding by-pass pipe 13, or hot oil conduits 21 and 22.

Regarding the premelter, a hopper 1, as illustrated in FIGURE 1, is adapted to retain pellets of a suitable thermoplastic coating resin, and possesses an adjustable slide 2 which permits access to the interior of the hopper. The hopper is mounted with all but one of the sides of the hopper positioned in intimate conformity with, though not touching, cylindrical carrier 3 along its upwardly inclined surface. The side of the hopper facing in the direction of motion for the carrier advantageously incorporates an adjustable slide which is adapted to provide an adjustable rectangular orifice between itself and the cylindrical carrier, through which said resin pellets can move upwardly along the carrying surface 3 as it moves out from under the hopper.

Figure 2:
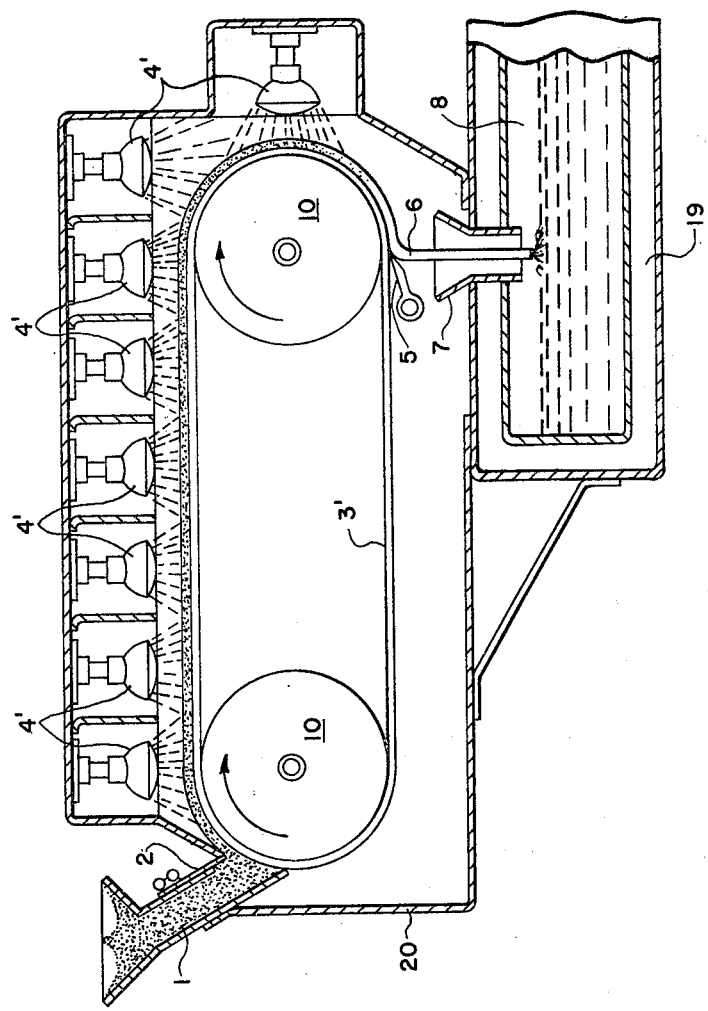
FIGURE 2 is an elevation and partial cross section of another embodiment of the premelter.

The carrier may be, as is illustrated in FIGURE 1, a suitable metal drum 3 capable of absorbing and transmitting heat and which is heated by one or more sources of radiant energy 4 (thermal radiation). Or, as is illustrated in FIGURE 2, the carrier may be a belt 3' of a metal or some other suitable heat absorbing and transmitting material, supported upon two cylindrical rollers 10 of which at least one of the rollers is driven by conventional means not shown. More than two such rollers can also be employed. The principle in either case is essentially identical and many adaptations are possible without departing from the spirit and scope of the present invention. The sources of thermal radiation may be quartz infrared tubes 4 as is illustrated in FIGURE 1 or infrared bulbs 4' as is illustrated in FIGURE 2, or any suitable means for providing that portion of the carrier which bears resin with an essentially uniform source of heat which can be quickly initiated and quickly terminated. Supplemental heat may be supplied, if desired (not shown), by other means such as by circulating heated air through the enclosure 20; however, care should preferably be taken not to supply heat so as to fuse the pellets of the resin in the hopper nor to have a heat source which cannot be fairly quickly reduced to a lower temperature when the premelting operation is interrupted either on an intermittant basis or when it shut down for a longer period of time. The carrier 3 or 3' is moved by any suitable power source (not shown) at a substantially constant speed which is advantageously adjusted in relationship to the melting characteristics of the resin, the temperature of the carrier surface and the amount of resin present on the carrier surface, so as to completely melt the resin prior to its being removed from the carrier surface as a moten lequid sheet 6 by a heated scaper blade 5 spring loaded to keep it in constant contact with the carrier surface 3. The scraper blade 5 can be heated by internal hot oil, an electric element, or by any other suitable means, at a temperature approximately equal to or somewhat above that of the molten resin whereby the force of garvity readily disengages the molten sheet of liquid resin 6 from the blade and it drops into the reservoir 8.

The sequence of premelting involves a repeating cycle and is a continuous operation. Pelletized resin which is first placed into the hopper 1 is prevented according to FIGURES 1 and 2, from spilling out between said hopper and the carrier by the close proximity of said carrier and three sides of said hopper. The resin issues, therefore, from the orifice positioned in the hopper's essentially upward facing side.

As the moving carrier surface 3 or 3' passes beneath the hopper, a sufficient amount of residual heat which is advantageously present causes the layer of resin pellets which rests against the moving carrier to soften enough so that they will adhere thereto by their own substance. In such fashion, the carrier continuously picks up a thin layer of solid resin pellets which then melt as the carrier continues its path of rotation. When this apparatus is operated under optimum conditions it appears that the layer which adheres to the hot conveying surface is only of a thickness approximating the width of the individual pellets. When this desired operation takes place the pellets in the hopper above those being removed by the conveyor may be carried along until they are brushed back by the adjustable slide 2, and/or they may fall by gravity or othewrise return to the hopper. This arrangement enables the premelter to be characterized by an especially compact and efficacious structure in relation to the other elements of the combination.

At any point in time, the sources of heat 4 irradiate only that portion of the carrier which bears resin. If the radiation should contact the hopper, for example, undesirable partial melting and clumping would be likely to take place within the hopper, contributing to sporadic feeding of pellets and an eventual clogging of the feed orifice.

According to a preferred embodiment the resin introduced into the hopper is in the form of pellets or granules of a size which is at least about 0.05 inch and preferably at least 0.1 inch in the smallest pellet dimension, on the average. Such pellets are generally no larger than about 0.75 inch and preferably no larger than about 0.5 inch in the largest pellet dimension, on the average.

When the layer of resin is most advantageosuly only one pellet thick, there is essentially no problem with regard to degradation caused by excess temperature. The temperature gradient present in the screw-type premelter, by way of comparison, does not exist in the single drum or belt types of premelters according to this invention, and these premelters can advantageously operate at a temperature only nominally in excess of the resin's melting point, i.e., within 25 to 50° C. and often within 10° to 15° C.

As the carrier continues to advance, the resin melt is scraped off by the heated blade which contacts the carrying surface 3, said melt 6 then falling through a suitable orifice 7 into a heated reservoir 8 wherein is retained a supply of liquid resin sufficient for operating interconnected apparatus for normal coating purposes. According to FIGURE 1 the pellets melted by such an apparatus are carried through an angle of rotation of about 210° beyond the upper horizontal position which would be designated as at the 0° angle. According to FIGURE 2 the melt is removed after an angle of rotation of about 180°. The range for such angles of rotation is preferably about 120° to about 240°.

Application of heat to the blade, which may be by electric resistance heaters, infrared tubes or any suitable means, enables to to scrape the resin melt off the carrier without it collecting on said blade. It has been found in some cases that if heat is not supplied to the blade, a significant amount of coating material may tend to collect upon its surface, with the result that the coating resin which collects upon the scraping blade has insulative properties which adversely interfere with the subsequent flow of molten resin over the blade and into the reservoir. Moreover, the collecting layer of resin is subjected to elevated temperature over a long period of time thus experiencing heat degradation and concomitant carbonizing. This is made more apparent when it is realized that cellulose ester compositions are among the well known generally used coating compositions. They are especially subject to degradation at temperatures both approaching the melting point and above. At these heat levels, the tendency to degrade increases rapidly with only slight increases in temperature. Thus, the use of a heated blade effects an unobvious decrease in the tendency of premelters to cause thermal degradation of thermoplastic coating resins. Unobvious results are heightened since the carrier surface provided by the drums or belt type premelter does in fact operate at a temperature level only slightly in excess of the melting point of the resin. This is to be contrasted with screw-type premelters which may often expose thermoplastic resins to temperatures over 100° C. in excess of the melting points.

Another great advantage of this invention is that thermal degradation is no problem while the premelter is stopped. After the slide is closed, thus shutting off the feed of resin pellets onto the carrier, very little time elapses before the carrier surface is scraped clean, after which the radiant heat sources are reduced to a lower level of thermal radiation or turned off completely.

Restarting can be accomplished almost immediately whenever desired. Warmup time is nominal, since there is only the drum or belt or the like to heat, and merely opening the slide of the hopper causes resin pellets to flow onto said carrier. No problem of clearing carbonized resin exists with the cylindrical drum-type or belt-type premelter.

Should cleaning be necessary on rare occasions, the system is not sealed and the drum or belt surface is easily accessible through one or more openings (not shown) in enclosure 20, or the enclosure can be easily arranged to be removed in its entirety. All operations can be performed simply and efficiently.

The drum or belt-type premelters, as disclosed hereinabove, possess great flexibility. By varying carrier surface width, operating temperature and speed of rotation, productivity levels are capable of considerable variation. These can be obtained without sacrificing any of the desirable results obtained with the drum or belt-type premelter.

As is apparent from the above description, this invention provides an especially advantageous and improved apparatus for curtain coating as article with a melt of a thermoplastic coating resin; said apparatus comprising;

(a) A nozzle adapted to form a continuously descending curtan of said melt, (b) Article translational means adapted to cause said curtain to fall upon the outwardly exposed surfaces of said article while supported in a fixed position on a substrate and while in relative motion with respect to said curtain, (c) Melt collecting means adapted to receive such portion of said descending curtain which is in excess of that portion retained upon said supported article, (d) Pumping means adapted to convey melt to said nozzle from said collecting means, and (e) Resin premelting means adapted to supply and maintain a sufficient amount of melt in the apparatus to provide a continuous curtain while articles are being coated and especially adapted to intermittently convert pellets of said resin into said melt by a subcombination having the several elements described above.

Adaptations not specifically disclosed hereinabove will be readily apparent to one skilled in the art and can be carried out without department from the spirit of the present invention. Thus, the belt-type apparatus can be arranged so as to have the movable surface slope upwardly between the rotatable axes whereby pellets can be deposited thereupon according to the principles described above.

Quite advantageously, the pumping means mentioned above can include conduit means provided with separation means (not shown) adapted to separate bubbles of gas or particles of contaminants from the melt as it is conveyed to the nozzle. The present invention is especially advantageous when present in combination with such separation means since this invention reduces the burden upon such separation means which are illustrated and described in the above identified Chenoweth et al. application, the disclosure of which is to be considered a part hereof to any extent necessary to further illustrate such separation means as a part of curtain coating apparatus.

Although the invention has been described in considerable detail with reference to certain preferred embodiments thereof, it will be understood that variations and modifications can be effected without departing from the spirit and scope of the invention as described hereinabove.

I claim:

1. Apparatus for curtain coating an article with a melt of a thermoplastic coating resin, said apparatus comprising:
- (a) a nozzle adapted to form a continuously descending curtain of said melt,
- (b) article translational means adapted to cause said curtain to fall upon the outwardly exposed surfaces of said article while supported in a fixed position on a substrate and while in relative motion with respect to said curtain,
- (c) melt collecting means adapted to receive such portion of said descending curtain which is in excess of that portion retained upon said supported article,
- (d) pumping means adapted to convey melt to said nozzle from said collecting means, and
- (e) resin premelting means adapted to supply and maintain a sufficient amount of melt in the apparatus to provide a continuous curtain while articles are being coated and especially adapted to intermittently convert pellets of said resin into said melt by a subcombination of,
    - (1) as pellet and melt carrying means, a movable endless surface adapted to be rotated around at least one substantially horizontal axis while pellets are being transformed into a melt upon said surface,
    - (2) as pellet and melt heating means, a source of thermal radiation directed toward said movable surface from a point beyond means for depositing pellets upon the surface and to at least a point in proximity to means for removing melt from the surface,
    - (3) as means for removing melt, a scraper blade in contact with said movable surface at a point upon the lower portion of said surface,
    - (4) means for maintaining said blade at a temperature at which the melt does not adhere to said blade, and
    - (5) as means for depositing pellets, a hopper positioned to deposit a thin layer of pellets upon said movable surface in advance of a point perpendicular to its horizontal axis when the movable surface is moved upwardly past the hopper.

References Cited

UNITED STATES PATENTS

| | | | |
|---|---|---|---|
| 2,198,621 | 4/1940 | Izard | 18—15 |
| 2,825,094 | 3/1958 | Zeigler | 18—15 X |
| 3,261,893 | 7/1966 | George et al. | 18—15 X |
| 3,303,816 | 2/1967 | Lauring | 118—324 X |

WALTER A. SCHEEL, Primary Examiner

J. P. McINTOSH, Assistant Examiner

U.S. Cl. X.R.

118—302, 324